No. 706,081. Patented Aug. 5, 1902.
L. P. MOOERS.
FRICTION CLUTCH.
(Application filed Oct. 30, 1901.)
(No Model.)
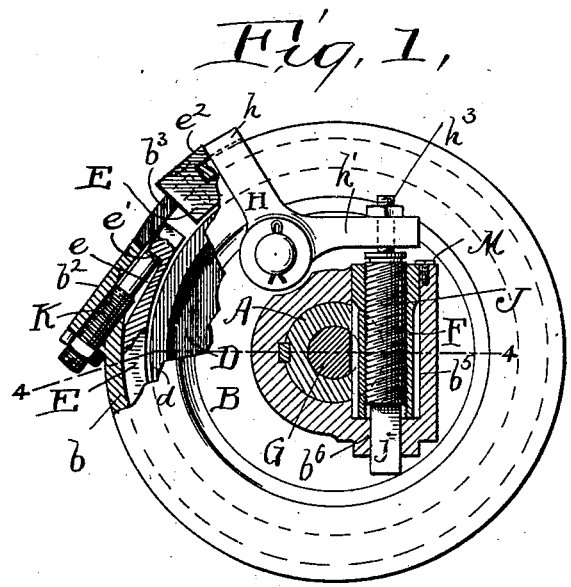
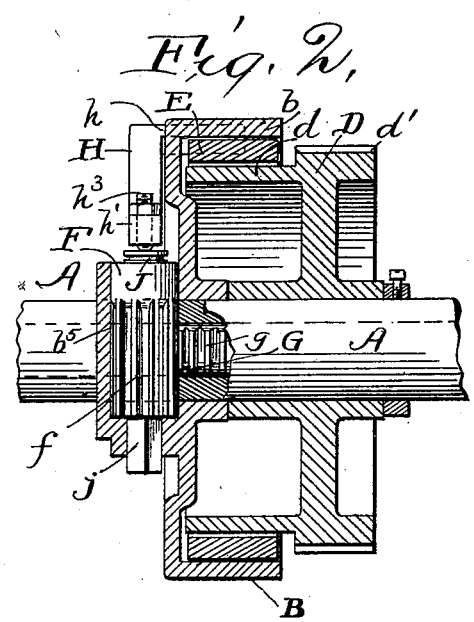
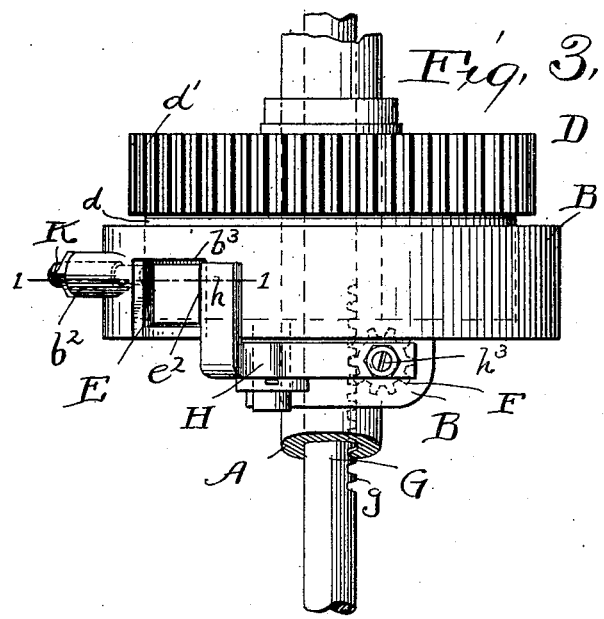
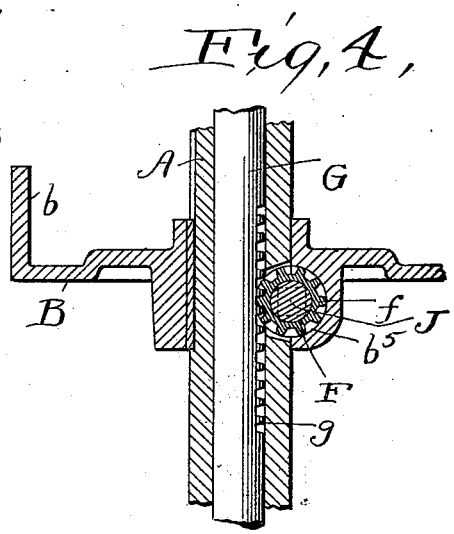
Witnesses
E. B. Gilchrist
H. M. Wise
Inventor,
Louis P. Mooers,
By his Attorneys,
Thurston & Bates.

UNITED STATES PATENT OFFICE.

LOUIS P. MOOERS, OF CLEVELAND, OHIO, ASSIGNOR TO THE PEERLESS MANUFACTURING COMPANY, OF CLEVELAND, OHIO, A CORPORATION OF OHIO.

FRICTION-CLUTCH.

SPECIFICATION forming part of Letters Patent No. 706,081, dated August 5, 1902.

Application filed October 30, 1901. Serial No. 80,486. (No model.)

*To all whom it may concern:*

Be it known that I, LOUIS P. MOOERS, a citizen of the United States, residing at Cleveland, in the county of Cuyahoga and State of Ohio, have invented a certain new and useful Improvement in Friction-Clutches, of which the following is a full, clear, and exact description, reference being had to the accompanying drawings.

The invention relates to a friction-clutch for connecting and disconnecting two independently-rotatable parts mounted in the same axial line. In the precise form shown it was designed and has been used for connecting and disconnecting change-speed gearing with a constantly-rotating shaft on a motor-vehicle. It is capable, however, of being used for many other specific purposes.

In the drawings, Figure 1 is a side elevation, partially sectioned on the line 1 1 on Fig. 3 and partly broken away. Fig. 2 is a longitudinal sectional view. Fig. 3 is a plan view of the mechanism, and Fig. 4 is a sectional view of a part of the mechanism in the plane indicated by the line 4 4 of Fig. 1.

Referring to the parts by letters, A represents a hollow shaft. B represents a member which has a cylindrical flange $b$ and is keyed or otherwise fastened to this shaft, and D represents a member rotatably mounted upon the shaft and having a cylindrical flange $d$ of less diameter than the flange $b$, into which it projects. The difference between the diameters of these two flanges is such that the annular space between them is somewhat wider than the thickness of the split clamping-ring E, which is carried by the member B and is adapted to be contracted against the flange $d$ for the purpose of connecting together the two independently-rotatable members B and D. It is of no consequence which of these two members is the normally movable member nor by what means it is rotated, nor is it material to the present invention what mechanism is provided for taking motion from the other of said members. In the embodiment of the invention shown the shaft A is intended to rotate constantly. When motion is to be transmitted from this shaft to other mechanism, the clamping-ring E is caused to grip the cylindrical flange $d$ of the member D, thereby connecting together the two members B and D. The member D is provided outside of the flange $d$ with gear-teeth $d'$, intended to engage with another gear or pinion.

The split clamping-ring E is made of resilient metal and will normally occupy a position in contact with the internal surface of the flange $b$ and out of contact but close to the external surface of the flange $d$. The inner surface of this ring may be faced with leather, wood, or other suitable material. A screw K, which screws through an external boss $b^2$ on the member B, enters a groove $e$ in the outer periphery of the split ring and abuts against the shoulder $e'$ at the end of said groove. On the outer periphery of this clamping-ring, near the other end thereof, is a shoulder $e^2$, which projects outwardly through a slot $b^3$ in the flange $b$. An angle-lever H is pivoted to the member B, and one arm $h$ of this lever extends outward and over the flange $b$ and against said shoulder $e^2$. By rocking this lever in the proper direction it will force that end of the clamping-ring on which is the shoulder $e^2$ toward the other end of said ring, thereby decreasing the diameter of said ring and causing it to grip with more or less force the cylindrical flange $d$. The arm $h'$ of the lever H extends over the end of a screw J, which screws through a nut F. This nut is rotatably mounted in a cylindrical recess $b^5$, formed partly in the member B and partly in the shaft A, which recess intersects the longitudinal opening through the shaft. The nut is provided with peripheral gear-teeth $f$, which engage with rack-teeth $g$ on a rack-bar G, which is longitudinally movable in the shaft A. This nut abuts at one end against the bottom of the recess in which it is mounted, and the head of a screw M, which is screwed into the member B adjacent to said recess, engages with the outer end of this nut, by which means endwise movement of the nut is prevented. The screw J has at its inner end a square shank $j$, which is fitted somewhat loosely in a hole $b^6$ in the bottom of the recess in which the nut is mounted.

The operation of the described mechanism is as follows: When the rack-bar G is moved in the shaft A, it turns the nut F upon the screw J. Since the screw cannot turn, being prevented by its square shank, and the nut cannot move endwise, the result is that the screw does move endwise in one direction or the other, and when it moves against the arm $h'$ of the lever H the lever is so moved as to cause the clamping-ring to be contracted against the flange $d$, the effect of this being, as aforesaid, to clutch the member D to the member B. When the screw is moved in the opposite direction, the split clamping-ring is allowed to loosen its grip upon the flange $d$, and by reason of its resiliency and in some degree by centrifugal force it expands against the flange $b$ and out of contact with the flange $d$.

As a convenient means for adjusting the described mechanism to compensate for wear or for any purpose a set-screw $h^3$ is screwed through the end of the arm $h'$ of the lever H, and this screw bears directly against the end of the screw J. There are, however, in the device two other means of adjustment, one of them being the screw K. The adjustment can also be effected by removing the nut F from the recess in which it is mounted and screwing it in one direction or the other along the screw J and then replacing the parts as they are shown.

It has not been thought necessary to show any bearings for the shaft A or any mechanism for operating the rack-bar G, because the specific mechanism employed for the latter purpose will be dependent largely upon the specific use to which the entire device is applied. Any mechanism capable of moving the rack-bar endwise in the shaft while both are rotating may be employed.

Having described my invention, I claim—

1. In a friction-clutch, the combination of two independently-rotatable members mounted upon the same axis and having respectively cylindrical flanges of different diameters, of which the smaller flange lies within the larger flange, a split clamping-ring in the annular space between said flanges and lying normally out of contact with the smaller flange, means preventing relative movement of the outer flange and one end of said ring, an external shoulder on the other end of said ring, a bent lever pivoted to the side of the member of which the larger flange is a part on a pivot parallel with the axis of said member, said lever having one arm which extends outward from its pivot and is bent over the top of the flange and into contact with the external shoulder on the ring, and mechanism engaging with the other end of said lever whereby to rock it, substantially as and for the purpose specified.

2. In a friction-clutch, the combination of two independently-rotatable members mounted upon the same axis having respectively cylindrical flanges of different diameters of which the smaller flange lies within the larger flange, a split clamping-ring in the annular space between said flanges and lying normally out of contact with the smaller flange, means preventing relative movement of the outer flange and one end of the ring, an external shoulder on the other end of said ring, a bent lever pivoted to the member of which the larger flange is a part having one arm which extends outward and over the top of the flange and into contact with the external shoulder on the ring, a nut rotatively mounted in the member carrying the larger flange, means preventing the endwise movement of said nut, a screw upon which the nut is fitted and which is adapted to engage with one arm of said bent lever, means preventing the rotation of said screw but permitting its endwise movement, and mechanism for rotating said nut, substantially as and for the purpose specified.

3. In a friction-clutch, the combination of a hollow shaft, a member B secured thereto, and having a cylindrical flange, a member D rotatively mounted upon said shaft and having a cylindrical flange which projects into the flange of the member B, a split clamping-ring lying in the annular space between said flanges and having one end connected with the member B and having near its other end an external shoulder, a bent lever pivoted to the member B having one arm adapted to engage with said shoulder, a nut rotatively mounted in a recess formed partly in the member B and partly in the hollow shaft and intersecting the hole through said shaft, said nut having external gear-teeth, means preventing the endwise movement of said nut, a screw fitted to said nut and having a squared end which enters and is movable in a square hole in the bottom of said recess, the opposite end of said screw being adapted to engage with an arm of said bent lever, and a rack movable through the hollow shaft and engaging with said nut, substantially as and for the purpose specified.

4. In a friction-clutch, the combination of a rotatable member B having a cylindrical flange, an independently-rotatable member D mounted in the same axial line and having a cylindrical flange of smaller diameter which lies within the flange of the member B, a split clamping-ring lying in the annular space between said flanges and having at one end an external groove with a shoulder at its end, a screw screwing through the flange of the member B and lying partly in said groove and abutting against said shoulder on the ring, and mechanism operating upon the other end of the split ring to reduce its diameter, substantially as and for the purpose specified.

In testimony whereof I hereunto affix my signature in the presence of two witnesses.

LOUIS P. MOOERS.

Witnesses:
L. H. KITTREDGE,
CHAS. W. EHRKE.